(12) United States Patent  
Hashimoto et al.

(10) Patent No.: US 7,804,628 B2  
(45) Date of Patent: Sep. 28, 2010

(54) IMAGE FORMING APPARATUS WITH AN OPEN-CLOSE REGULATION MECHANISM OF THE AUTOMATIC DOCUMENT FEEDER

(75) Inventors: Haruo Hashimoto, Ibaraki (JP); Takamitsu Ikematsu, Ibaraki (JP); Katsumi Kumada, Ibaraki (JP); Masato Moribe, Aichi (JP)

(73) Assignees: Ricoh Printing Sysetms, Inc., Minato-ku, Tokyo (JP); Brother Kogyo Kabushiki Kaisha, Nagoya-shi, Aichi (JP)

( * ) Notice: Subject to any disclaimer, the term of this patent is extended or adjusted under 35 U.S.C. 154(b) by 1066 days.

(21) Appl. No.: 11/510,735

(22) Filed: Aug. 28, 2006

(65) Prior Publication Data  
US 2007/0047028 A1    Mar. 1, 2007

(30) Foreign Application Priority Data  
Aug. 29, 2005    (JP)    ............................ P2005-247973

(51) Int. Cl.  
*H04N 1/04*    (2006.01)

(52) U.S. Cl. ........................ 358/494; 358/400; 358/474; 358/496; 358/497; 358/498; 399/125; 399/379

(58) Field of Classification Search ................. 358/400, 358/474, 471, 494, 496, 497, 498; 399/125, 399/379; 292/8  
See application file for complete search history.

(56) References Cited

U.S. PATENT DOCUMENTS 6,510,301 B2 *   1/2003   Tanaka ........................ 399/125

FOREIGN PATENT DOCUMENTS

| JP | 2000-221746 | 8/2000 |
|----|-------------|--------|
| JP | 2001-281771 | 10/2001 |
| JP | 2002-62705  | 2/2002 |
| JP | 2002-82590  | 3/2002 |

* cited by examiner

*Primary Examiner*—Benny Q Tieu  
*Assistant Examiner*—Martin Mushambo  
(74) *Attorney, Agent, or Firm*—McGinn IP Law Group, PLLC

(57) ABSTRACT

An image forming apparatus includes: an image forming unit that forms an image on a recording sheet; an image reading unit provided above the image forming unit so as to open and close with respect to the image forming unit; an automatic document feeder provided above the image reading unit so as to open and close with respect to the image reading unit; and an open-close regulation mechanism that regulates opening and closing movements of the automatic document feeder so that when the image reading unit is closed with respect to the image forming unit, the automatic document feeder is capable of opening with respect to the image reading unit, and when the image reading unit is opened with respect to the image forming unit, the automatic document feeder is prevented to open with respect to the image reading unit.

20 Claims, 7 Drawing Sheets

IMAGE FORMING APPARATUS WITH AN OPEN-CLOSE REGULATION MECHANISM OF THE AUTOMATIC DOCUMENT FEEDER

BACKGROUND OF THE INVENTION

1. Field of the Invention

The present invention relates to an image forming apparatus such as a copier, a printer, a facsimile machine, a printing machine, and a multifunction machine in which a copying function and a facsimile function are combined together. Particularly, the present invention relates to an image forming apparatus including an image forming unit; an image reading unit provided above the image forming unit so as to open and close; and an automatic document feeder provided above the image reading unit so as to open and close.

2. Description of the Related Art

Recently, in order to make an attempt to make an image forming apparatus compact by reducing the footprint of the image forming apparatus, there has been considered and developed an image forming apparatus including: a tray unit in which recording sheets having images formed thereon are to be discharged and stacked is provided above an image forming unit; an image reading unit provided above the tray unit so as to open and close; and an automatic document feeder provided above the image reading unit so as to open and close.

For instance, JP-A-2000-221746, JP-A-2002-062705 and JP-A-2002-082590 disclose the image forming apparatus having the above configuration.

SUMMARY OF THE INVENTION

Incidentally, the image forming apparatus, which has hitherto been considered and developed, has a configuration in which the automatic document feeder can open freely when the image reading unit opens. When the image reading unit is opened and closed for replacing expendables of the image forming unit or correcting a paper jam, and the like, the automatic document feeder provided above the image reading unit also freely opens and closes. Accordingly, the automatic document feeder inadvertently opens thereby collides with peripheral equipment, a sidewall, and the like, and gives damage on the automatic document feeder itself and/or the peripheral equipment.

Since an image reading face of the image reading unit is exposed when the automatic document feeder opens, there arises a case where the image reading face is covered with dust or flawed, which in turn affects a printed image. For these reasons, a user has to clean the image reading face, again generate copies, and the like. Thus, the user has suffered from the poor usability.

The present has been made in view of above circumstances and provides an image forming apparatus. According to an aspect of the invention, there is provided an image forming apparatus which does not inflict damage to the automatic document feeder and/or the peripheral equipment when an image reading unit opens, and has superior usability.

According to another aspect of the invention, there is provided an image forming apparatus including: an image forming unit that forms an image on a recording sheet; an image reading unit provided above the image forming unit so as to open and close with respect to the image forming unit; an automatic document feeder provided above the image reading unit so as to open and close with respect to the image reading unit; and an open-close regulation mechanism that regulates opening and closing movements of the automatic document feeder so that when the image reading unit is closed with respect to the image forming unit, the automatic document feeder is capable of opening with respect to the image reading unit, and when the image reading unit is opened with respect to image forming unit, the automatic document feeder is prevented to open with respect to the image reading unit.

The open-close regulation mechanism may include a lock mechanism between the image reading unit and the automatic document feeder. And the lock mechanism may regulate the opening and closing movements of the automatic document feeder in conjunction with opening and closing movements of the image reading unit.

The lock mechanism may include: a hook; a lock lever that engages with the hook; a spring that elastically urges the lock lever toward the hook; a contact member provided monolithically with the lock lever; a lever rotatable support member that rotatably supports the lock lever and the contact member; and an arm that rotates in conjunction with the opening and closing movements of the image reading unit and is provided between the image forming unit and the image reading unit. The hook may be provided on the automatic document feeder, and the lock lever, the spring, the contact member, and the lever rotatable support member may be provided on the image reading unit. When the image reading unit is closed, the contact member may remain in contact with the arm and the lock lever may remain separated from the hook against an elasticity of the spring. On the other hand, when the image reading unit is opened, the contact member may be separate from the arm and the lock lever may engage with the hook by the elasticity of the spring.

The image forming apparatus may further include a damper mechanism that temporarily increases a resistance to a closing direction of the image reading unit during the closing movement of the image reading unit with respect to the image forming unit.

The open-close regulation mechanism may include the damper mechanism.

The damper mechanism may include: an arm that is provided between the image forming unit and the image reading unit and rotates in conjunction with opening and closing movements of the image reading unit; and a contact member that is provided on the image reading unit and goes beyond the arm. The resistance to the closing direction may be temporarily increased when the contact member goes beyond the arm.

The image forming apparatus may further include a cover member provided opposing a position where the image reading unit corresponds to the image forming unit when the image reading unit is closed. The cover member may be configured so as to open and close without an interference with the image reading unit when the image reading unit is opened up to a predetermined position.

According to the above configuration, when an image reading unit opens, damage is not inflicted on the automatic document feeder or the peripheral equipment, and exposure of the image reading surface of the image reading unit is minimized. Accordingly, the image forming apparatus prevents adherence of dust to or occurrence of flaws in the image reading surface and is superior in terms of the operability.

BRIEF DESCRIPTION OF THE DRAWINGS

Embodiments of the present invention will be described in detail based on the following figures, wherein:

FIG. 4 is a general view for describing a function of the multifunction electrophotography apparatus for temporarily increasing resistance to closing movement of the image reading unit;

DETAILED DESCRIPTION OF THE INVENTION

Figure 1:
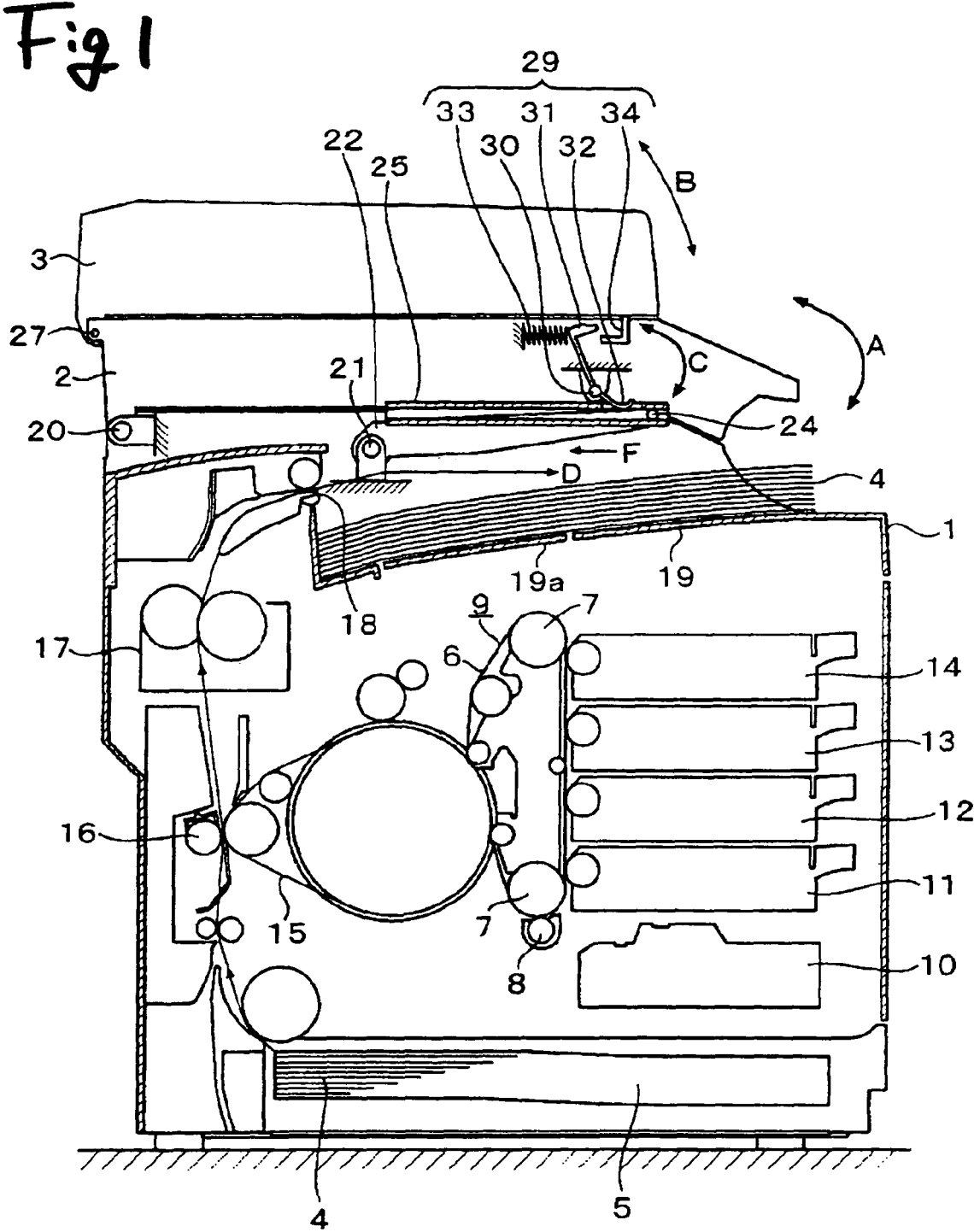
FIG. 1 is a general view of a multifunction electrophotography apparatus according to an embodiment of the present invention during normal image forming operation.
Figure 2:
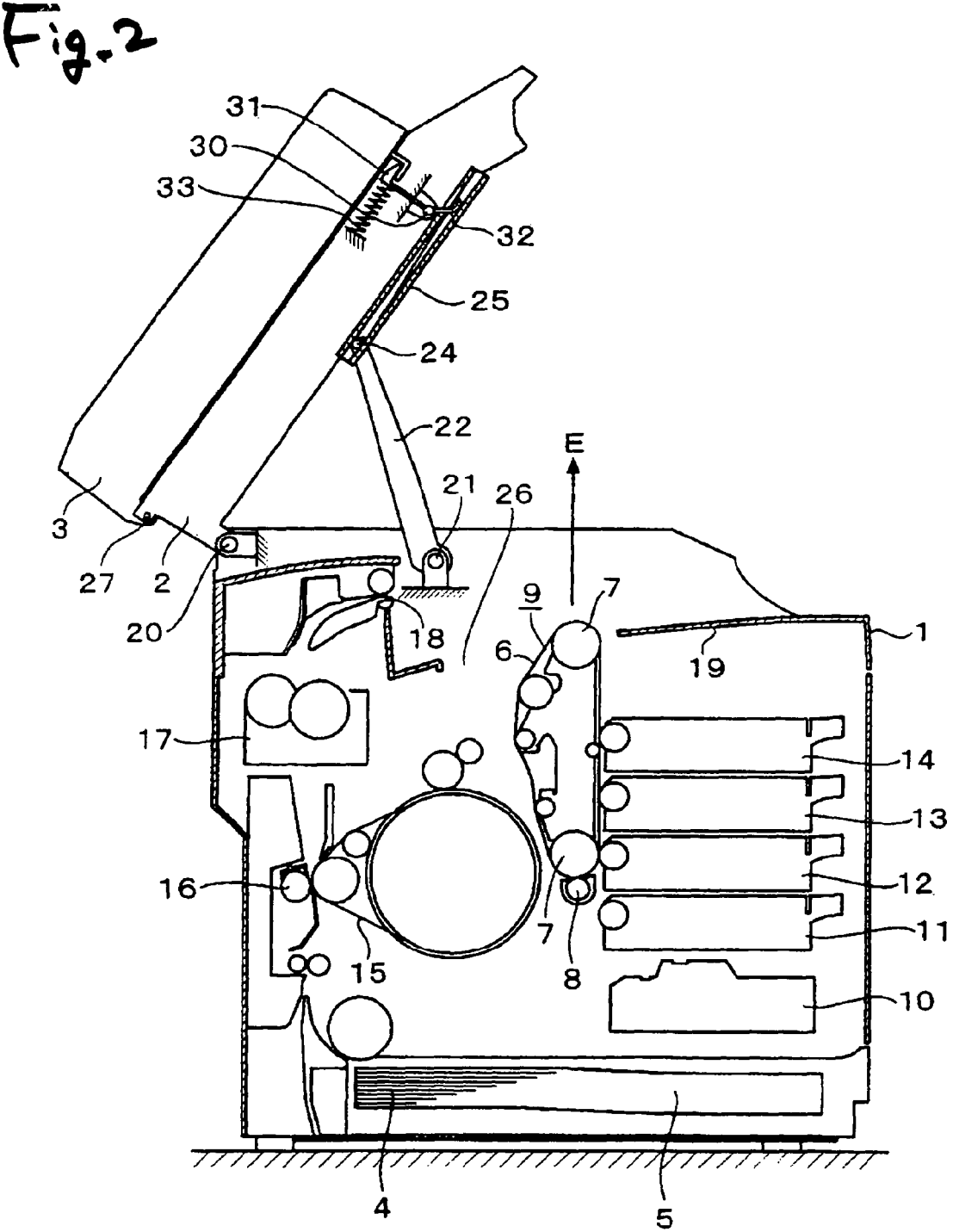
FIG. 2 is a general view of the multifunction electrophotography apparatus, showing that an image reading unit fully opens.
Figure 3:
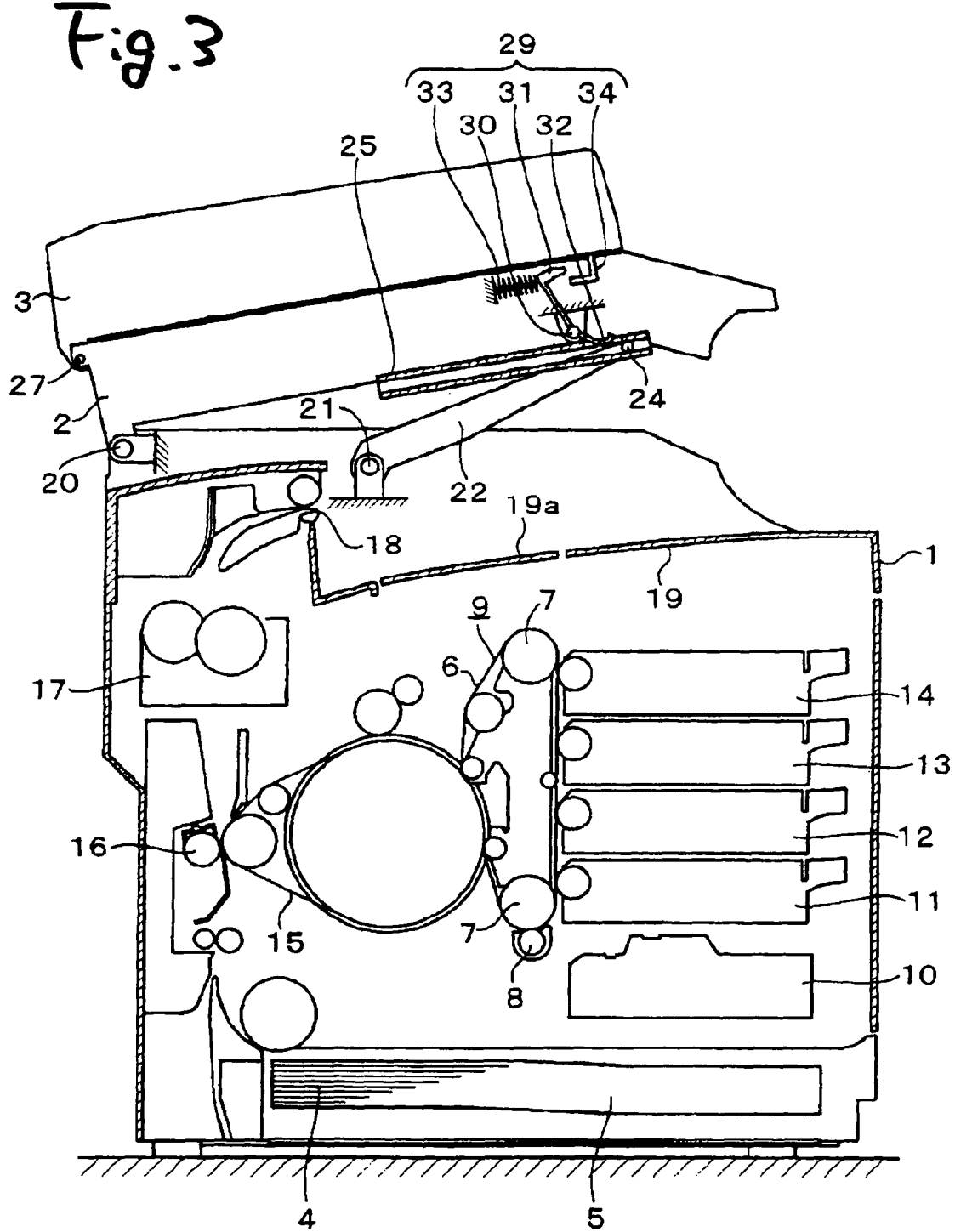
FIG. 3 is a general view for describing a function of the multifunction electrophotography apparatus for temporarily increasing resistance to a closing movement of the image reading unit.
Figure 9:
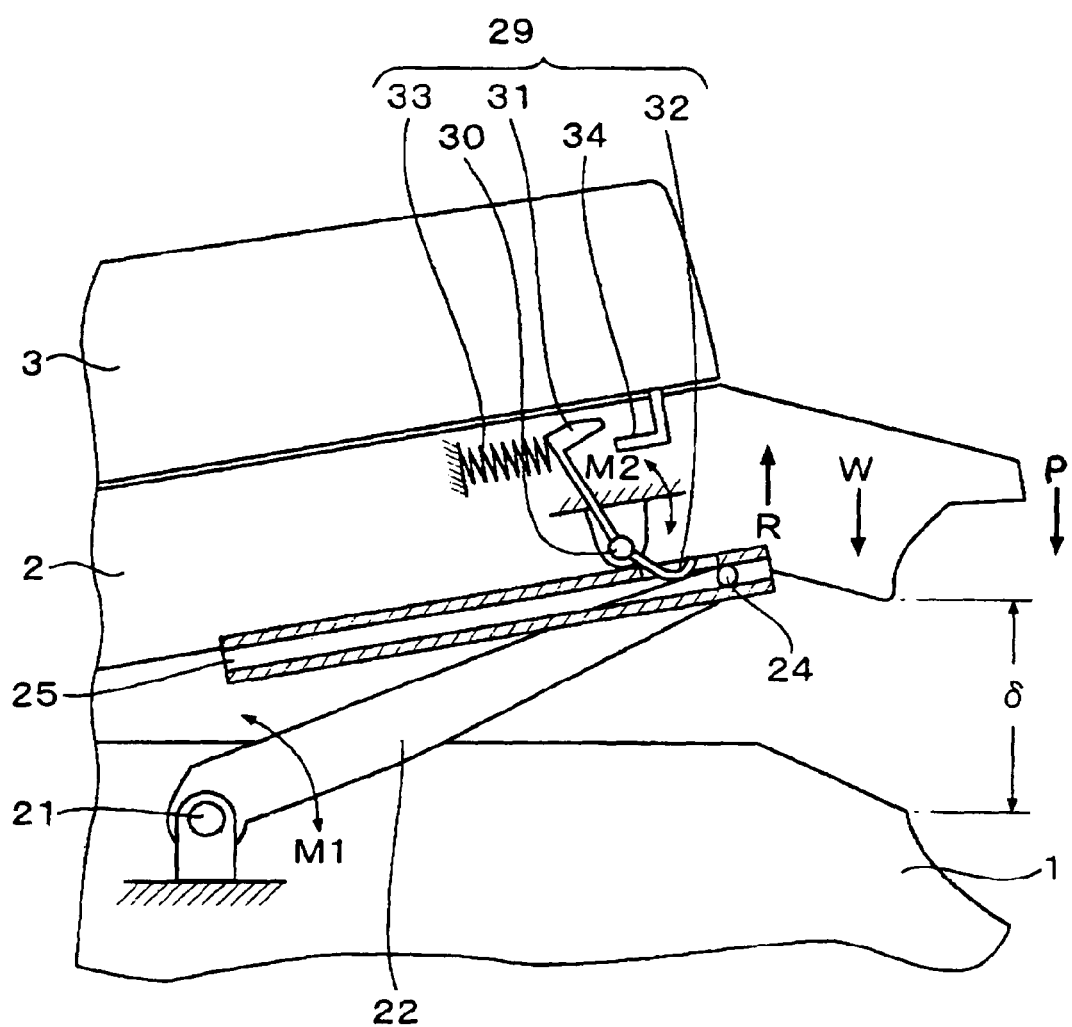
Figure 5:
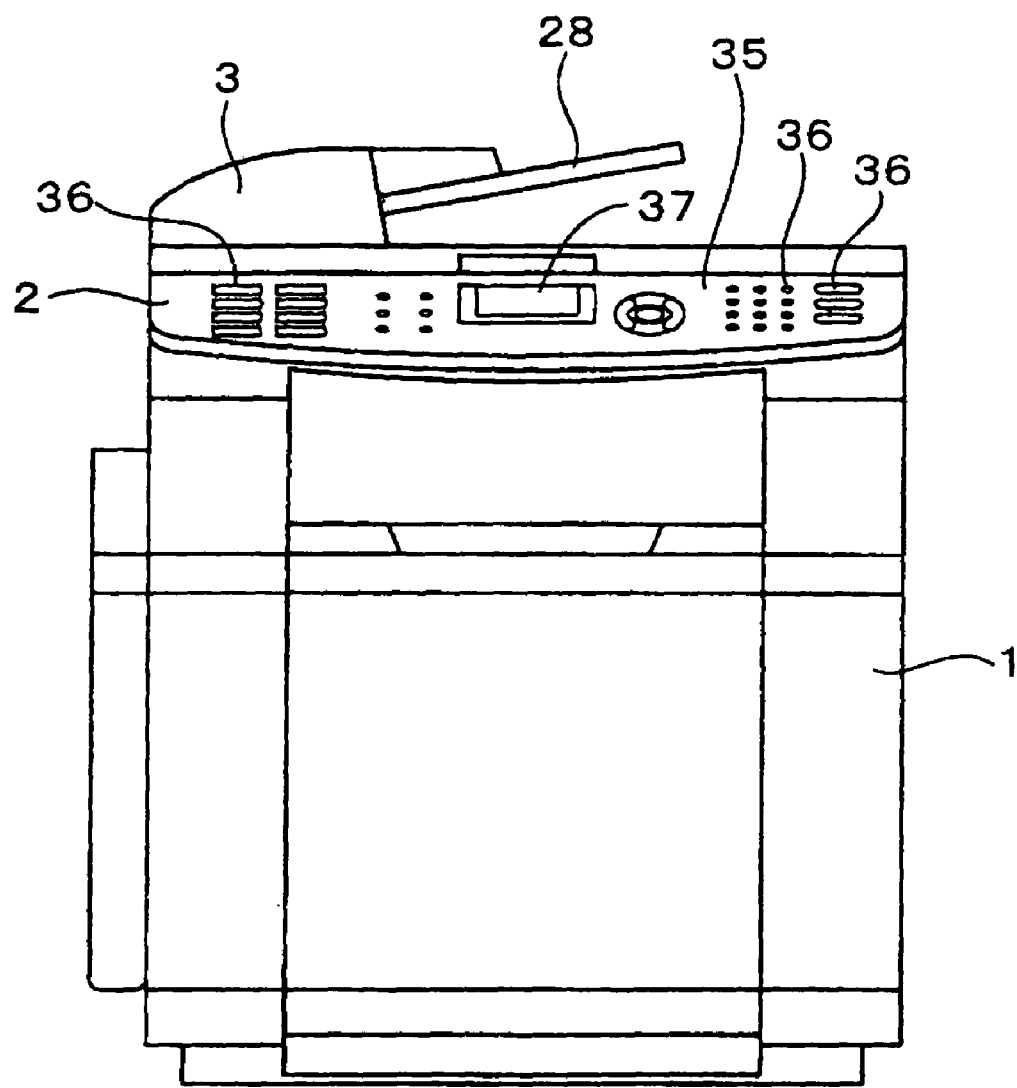
FIG. 5 is a front view of the multifunction electrophotography apparatus in a normal condition.
Figure 6:
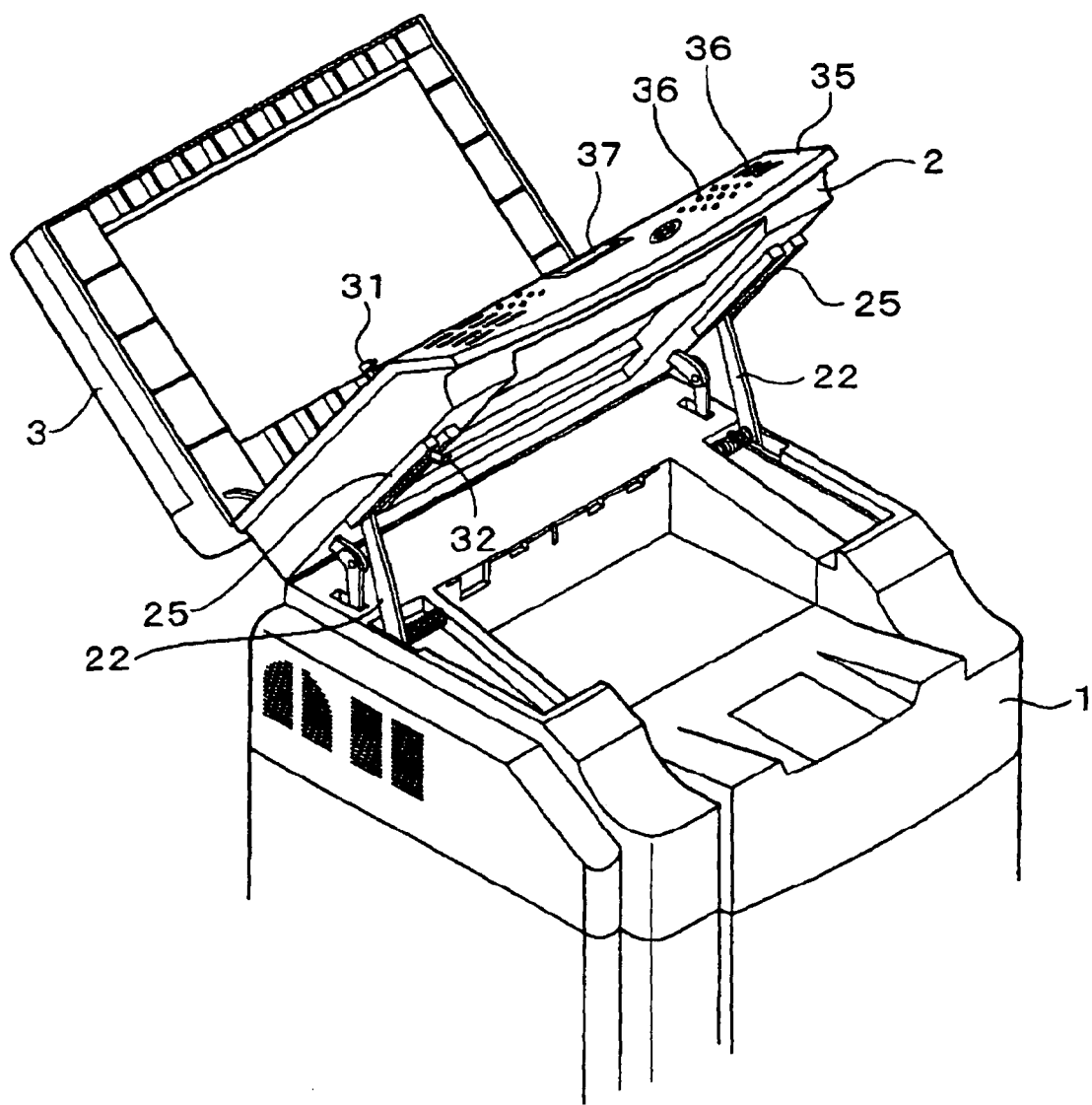
FIG. 6 is a perspective view showing that the image reading unit of the multifunction electrophotography apparatus is fully open.
Figure 7:
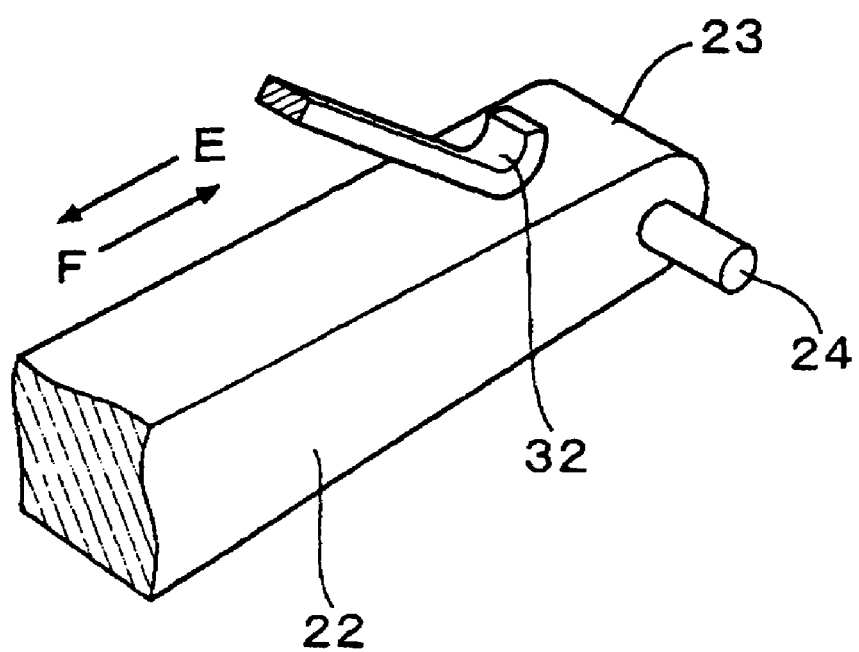
FIG. 7 is an enlarged perspective view showing a portion of an arm and that of a contact member in the multifunction electrophotography apparatus.

An embodiment of the present invention will now be described with reference to the drawings. FIG. 1 is a general view of a multifunction electrophotography apparatus according to the present embodiment, which has a combination of a copying function and a facsimile function, during a normal image forming operation; FIG. 2 is the general view of the multifunction electrophotography apparatus, showing that an image reading unit fully opens; FIGS. 3 and 4 are general views of the multifunction electrophotography apparatus for describing a pause function of the image reading unit; FIG. 5 is a front view of the multifunction electrophotography apparatus in a normal condition; FIG. 6 is a perspective view showing that the image reading unit of the multifunction electrophotography apparatus fully opens; and FIG. 7 is an enlarged perspective view showing a portion of an arm and that of a contact member in the multifunction electrophotography apparatus.

This multifunction electrophotography apparatus chiefly includes an image forming unit 1; an image reading unit 2 provided above the image forming unit 1; and an automatic document feeder 3 provided above the image reading unit 2.

A sheet-feeding tray S on which recording sheets 4 are mounted is removably attached to a lower portion of the image forming unit 1. A photosensitive member unit 9 includes a belt-shaped photosensitive member 6, a plurality of suspension rollers 7 for suspending and rotationally driving the belt-shaped photosensitive member 6, and an electrifying device 8 disposed opposite one of the suspension rollers 7. The photosensitive member unit 9 is removably provided above the sheet-feeding tray 5. In the present embodiment, the electrifying device 8 and the photosensitive member unit 9 are integrated together. However, the electrifying device 8 and the photosensitive member unit 9 can also be separated from each other.

An optical unit 10 having a built-in laser light source (not shown) is provided in the vicinity of the electrifying device 8 where the optical unit opposes to the belt-shaped photosensitive member 6. A developer unit 11 accommodating, e.g., black toner; a developer unit 12 accommodating, e.g., yellow toner; a developer unit 13 accommodating, e.g., magenta toner; and a developer unit 14 accommodating, e.g., cyan toner, are arranged in a multilayer layout a position above the optical unit 10 where the developer units oppose to a vertical portion of the belt-shaped photosensitive member 6.

An intermediate transfer belt 15 is provided in close proximity to the belt-shaped photosensitive member 6, and the intermediate transfer belt 15 opposes to a transfer unit 16. A fusing device 17 is positioned above the transfer unit 16. A sheet output port 18 is provided at an upper oblique position with respect to the fusing device 17. An output sheet tray 19, on which the recording sheets 4 having images formed thereon are discharged and stacked, is provided beneath the sheet output port 18. This output sheet tray 19 is formed from a portion of a casing of the image forming unit 1. A portion of the sheet output tray 19 opposing to the photosensitive member unit 9 forms a removable cover member 19a. As shown in FIG. 1, the cover member 19a also opposes to the image reading unit 2 with a space therebetween for use in removing a sheet.

The image forming unit 1 has a configuration as mentioned above. In accordance with an image signal optically read by the image reading unit 2 or the electronic data captured from a personal computer, a full-color image is formed on the recording sheet 4 by a known electrophotography process; namely, electrification, exposure, development, transfer, and fixing operations. The recording sheet 4 is output in the direction of arrow D, and piled on the output sheet tray 19 (see FIG. 1).

In an upper portion of the image forming unit 1, an open-close support member 20 for supporting the image reading unit 2 so that the image reading unit 2 can open and close is provided spaced away from the output sheet tray 19. The open-close support member 20 includes a support shaft and a shaft bearing. The image reading unit 2 opens and closes around the open-close support member 20 in the direction of arrow A with respect to the image forming unit 1 (see FIG. 1).

An arm support member 21 is provided in the upper portion of the image forming unit 1. A base end portion of each of arms 22 is pivotally supported by the arm support member 21. As shown in FIG. 7, the entirety of each of the arms 22 has a prismatic shape, and an end portion of the arm has a round portion 23. A projection portion 24 projects monolithically from a side surface of the end portion.

A guide member 25 having a linearly-extending groove is attached to a lower surface of the image reading unit 2. The projection portion 24 attached to the end portion of the arm 22 is slidably inserted into the groove of the guide member 25. As shown in FIG. 6, a pair of the arm 22 and the guide member 25 is provided on both sides of the image forming unit 1. As shown in FIG. 2, the image reading unit 2 is held in a fully-opened state (open position) in conjunction with the arms 22 and the guide members 25.

FIG. 2 shows a state achieved at the time of replacement of the photosensitive member unit 9. As illustrated, when the image reading unit 2 has been opened up to a predetermined position, the arms 22 are also pivoted synchronously to an upright position, whereby the open position of the image reading unit 2 is retained. The cover member 19a is opened in this state, to thus form an opening 26. As indicated by arrow E, the photosensitive member unit 9 is withdrawn from the opening 26, and a new photosensitive member unit 9 is attached by way of the opening 26, whereby a part is replaced.

FIG. 2 illustrates the case of replacement of a part. When a jammed recording sheet is removed or when the apparatus is subjected to maintenance or inspection, predetermined work is performed by opening the image reading unit 2 and the cover member 19a. Accordingly, the open position of the image reading unit 2 is set so that opening-and-closing movements of the cover member 19a, replacement of a part, removal of a jammed sheet, maintenance, inspection, and the like, can be performed without interference with the image reading unit 2.

The automatic document feeder 3 which is placed on the image reading unit 2 and feeds a document sequentially to the image reading unit 2 is joined to an open-close support member 27 so as to open and close in the direction of arrow B. As shown in FIG. 5, the automatic document feeder 3 is provided with a document tray 28 on which a document is to be placed. As shown in FIG. 1, the open-close support member 27 and the open-close support member 20 are provided on; e.g., the same side of the image forming apparatus.

An open-close regulation mechanism 29 that regulates opening and closing movements of the automatic document feeder 3 is provided between the image reading unit 2 and the automatic document feeder 3. The open-close regulation mechanism 29 includes a lever rotatable support member 30 provided in the image reading unit 2; a lock lever 31 that is pivotally supported by the lever rotatable support member 30 and extends toward the automatic document feeder 3; a contact member 32 that is provided monolithically with the lock lever 31 and extends toward the guide member 25; a compression spring 33 that elastically urges the lock lever 31 in a locking direction at all times; and a hook 34 that is provided on the lower surface of the automatic document feeder 3 and is adapted to engage with the lock lever 31.

As shown in FIG. 1, the lock lever 31 and the contact member 32 can rotate around the lever rotatable support member 30 in the direction of arrow C, and is elastically urged in a clockwise direction by the compression spring 33.

As shown in FIG. 1, during formation of an image, the image reading unit 2 is positioned at a close position with respect to the image forming unit 1. Therefore, the arms 22 are recumbent. The projection portion 24 provided at the end portion of each of the arms 22 is positioned close to the end portion of the guide member 25. As shown in FIGS. 1 and 7, the end portion of each of the arms 22 remains seated below the contact member 32 of the open-close regulation mechanism 29. In other words, the contact member 32 remains seated above a flat surface of the end portion of each of the arms 22.

As a result of the contact member 32 remaining seated above the end portion of each of the arms 22, the lock lever 31 is pushed toward a position spaced away from the hook 34 against resilience of the compression spring 33. Accordingly, the lock lever 31 and the hook 34 remain in a non-engaged state, and the automatic document feeder 3 can open and close with respect to the image reading unit 2. For instance, when a jammed document can be removed by opening the automatic document feeder 3, or work for maintenance, inspection, and the like, of the image reading unit 2 and the automatic document feeder 3 can be performed.

When the image reading unit 2 in the state shown in FIG. 1 starts to open for replacement of the photosensitive member unit 9, the projection portions 24 of the arms 22 start to move in the direction of arrow F in association with movement of the image reading unit 2. When the image reading unit 2 is slightly opened, the contact members 32 are disengaged from the end portions of the arms 22. By the elastic force of the compression spring 33, the lock lever 31 rotates around the lever rotatable support member 30 toward the hook 34, whereupon the lock lever 31 engages with the hook 34 to thus automatically enter a locked state.

As mentioned above, opening and closing movements of the automatic document feeder 3 on the image reading unit 2 are regulated by the open-close regulation mechanism 29.

Hence, inadvertent opening of the automatic document feeder 3, which would otherwise be caused when the image reading unit 2 is opened can be prevented. Consequently, infliction of damage to the automatic document feeder 3 itself and/or peripheral equipment can be prevented, and exposure of the image reading surface of the image reading unit 2 is also prevented. Accordingly, adherence of dust to or occurrence of flaws in the image reading surface can be prevented.

FIG. 2 is a view showing that the image reading unit 2 opens up to a predetermined position while the automatic document feeder 3 remains locked. The image reading unit 2 is held in the open position by the arms 22, and work for replacement of, e.g., the photosensitive member unit 9, is performed in this state.

When the image reading unit 2 is closed after predetermined work, the projection portions 24 at the end portions of the arms 22 move in the direction of arrow G along the guide members 25 in association with closing movement. When the closing movement of the image reading unit 2 comes to an end, the end portions of the arms 22 reach positions below the respective contact members 32. As shown in FIG. 7, by utilizing the round portion 23 formed at each of the end portions of the respective arms 22, the contact member 32 remains seated above the flat surface of the end portion of each of the arms 22.

By the movement of the contact members 32, the lock lever 31 rotates in a direction to disengage from the hook 34 against the elasticity of the compression spring 33, whereupon the lock lever 31 becomes disengaged from the hook 34. As shown in FIG. 1, the automatic document feeder 3 thus enters a state where the open-close regulation mechanism 29 allows opening and closing of the automatic document feeder 3 on the image reading unit 2.

A damper effect of the open-close regulation mechanism 29 will now be described with reference to FIGS. 3 and 4.

FIG. 3 shows that, when the image reading unit 2 is closed so that clearance between the image reading unit 2 and the image forming unit 1 has become δ, the contact member 32 of the open-close regulation mechanism 29 contacts the arms 22, whereby resistance to closing movement is temporarily increased. The reason for this is as follows.

When the image reading unit 2 is closed, the image reading unit 2 freely falls under the total weight of the image reading unit 2 and the automatic document feeder 3, there is a potential risk of the user's hand being erroneously caught between the image reading unit 2 and the image forming unit 1. In order to prevent such an accident, when the clearance between the image reading unit 2 and the image forming unit 1 has become δ, resistance to closing movement temporarily increases (the damper effect). When the user has noticed the change in resistance, catching of the hand can be prevented. Accordingly, the clearance δ is set to a distance sufficient for preventing catching of the user's hand.

A damper mechanism by which resistance to closing movement of the image reading unit 2 increases when the clearance is δ will now be described with reference to FIG. 4. FIG. 4 shows states of moment and force act on the arms 22 and the open-close regulation mechanism 29.

Rotational moment M2 acts on the contact members 32 by the self-weight W of the image reading unit 2 and the automatic document feeder 3, force P exerted by the user for closing the image reading unit 2, and reaction force R from the arms 22. Meanwhile, rotational moment Ml acts on the arms 22 by the self-weight W of the image reading unit 2 and the automatic document feeder 3 and the force P exerted by the user for closing the image reading unit 2.

Consequently, so long as a design is made in such a way that the rotational moment M2 on the contact members 32 and the rotational moment M1 on the arms 22 become zero, the resistance of the image reading unit 2 against closing movement increases when the clearance is δ. The force and the moments are subjected to the size of the arms 22 and the size of the open-close regulation mechanism 29, and hence can be freely designed.

Specifically, even when the image reading unit 2 has closed under the self weight thereof and the self weight of the automatic document feeder 3, resistance to closing movement temporarily increases at a point where the contact members 32 contact and go beyond the end portions of the arms 22. Moreover, when the user does not exert a certain force or more, the image reading unit 2 fails to completely close with respect to the image forming unit 1, whereby an image forming apparatus, which is safe and easy to use for the user, can be provided.

The electrophotography apparatus of the present embodiment has a combination of the copying function and the facsimile function. As shown in FIG. 5, keys 36 used for inputting a phone number of a destination or the number of copies and a liquid-crystal display face 37 are set in a console panel 35 of the image reading unit 2.

FIG. 6 is a perspective view showing that the image reading unit 2 is fully open. In order to exhibit the lock lever 31 provided on the image reading unit 2, the automatic document feeder 3 is illustrated as being opened.

The present embodiment has described a case where the multifunction electrophotography apparatus has a combination of the copying function and the facsimile function. However, the present invention is not limited to this apparatus. For instance, the present invention can be applied to various types of image forming apparatus, such as a copier, a printer, a facsimile, a printing machine, or a multifunction machine having a combination of other features.

The entire disclosure of Japanese Patent Application No. 2005-247973 filed on Aug. 29, 2005 including specification, claims, drawings and abstract is incorporated herein by reference in its entirety.

What is claimed is:

1. An image forming apparatus comprising:
    an image forming unit that forms an image on a recording sheet;
    an image reading unit provided above the image forming unit so as to open and close with respect to the image forming unit;
    an automatic document feeder provided above the image reading unit so as to open and close with respect to the image reading unit; and
    an open-close regulation mechanism that regulates opening and closing movements of the automatic document feeder so that
        when the image reading unit is closed with respect to the image forming unit, the automatic document feeder is capable of opening with respect to the image reading unit, and
        when the image reading unit is opened with respect to the image forming unit, the automatic document feeder is prevented to open with respect to the image reading unit,
    wherein the open-close regulation mechanism includes a lock mechanism that includes:
        a hook;
        a lock lever that engages with the hook;
        a spring that elastically urges the lock lever toward the hook;
        a contact member provided monolithically with the lock lever;
        a lever rotatable support member that rotatably supports the lock lever and the contact member; and
        an arm that rotates in conjunction with the opening and closing movements of the image reading unit, the arm being provided between the image forming unit and the image reading unit,
    wherein when the image reading unit is closed with respect to the image forming unit, the contact member remains in contact with the arm and the lock lever remains separated from the hook against an elasticity of the spring to thereby automatically disengage the image reading unit and the automatic document feeder, and
    wherein when the image reading unit is opened with respect to the image forming unit, the contact member is separated from the arm and the lock lever engages with the hook by the elasticity of the spring to thereby automatically engage the image reading unit and the automatic document feeder.

2. The image forming apparatus according to claim 1,
    wherein the lock mechanism is located between the image reading unit and the automatic document feeder, and
    wherein the lock mechanism regulates the opening and closing movements of the automatic document feeder in conjunction with opening and closing movements of the image reading unit.

3. The image forming apparatus according to claim 2,
    wherein the hook is provided on the automatic document feeder, and the lock lever, the spring, the contact member, and the lever rotatable support member are provided on the image reading unit.

4. The image forming apparatus according to claim 1, further comprising a damper mechanism that temporarily increases a resistance to a closing movement of the image reading unit during the closing movement of the image reading unit with respect to the image forming unit.

5. The image forming apparatus according to claim 4, wherein the open-close regulation mechanism includes the damper mechanism.

6. The image forming apparatus according to claim 4,
    wherein the damper mechanism includes:
        an arm that is provided between the image forming unit and the image reading unit and rotates in conjunction with opening and closing movements of the image reading unit; and
        a contact member that is provided on the image reading unit and goes beyond the arm,
    wherein the resistance to the closing movement is temporarily increased when the contact member goes beyond the arm.

7. The image forming apparatus according to claim 1, further comprising a cover member provided opposing a position where the image reading unit corresponds to the image forming unit when the image reading unit is closed,
    wherein the cover member is configured so as to open and close without an interference with the image reading unit when the image reading unit is opened up to a predetermined position.

8. The image forming apparatus according to claim 1, wherein, if the image reading unit is closed with respect to the image forming unit, the contact member contacts the arm and rotates about the lever rotatable support member, thereby pushing the lock lever to rotate away from the hook.

9. The image forming apparatus according to claim 1, wherein the spring is connected to the lock lever.

10. The image forming apparatus according to claim 1, wherein, if the image reading unit is opened with respect to the image forming unit, the contact member automatically disengages from the arm, thereby causing an elastic force of the spring to rotate the lock lever around the level rotatable support member and towards the hook.

11. The image forming apparatus according to claim 1, wherein the image reading unit is held in an open position with respect to the image forming unit by the arm.

12. The image forming apparatus according to claim 1, wherein the arm supports the image reading unit to be in an open position with respect to the image forming unit.

13. The image forming apparatus according to claim 1, wherein the arm further comprises:
   a projection portion at an end portion of the arm; and
   a base end portion at another end of the arm that is pivotally supported by an arm support member located on the image forming unit.

14. The image forming apparatus according to claim 13, further comprising a guide member attached to a lower surface of the image reading unit to allow the end portion of the arm to be slidably inserted into a groove of the guide member.

15. An image forming apparatus, comprising:
   an image forming unit;
   an image reading unit located above the image forming unit;
   an automatic document feeder located above the image reading unit; and
   an open-close regulation mechanism,
   wherein the open-close regulation mechanism includes:
      a hook;
      a lock lever that engages the hook;
      a spring connected to the lock lever that pushes the lock lever toward the hook;
      a contact member connected to the lock lever via a lever rotatable support member; and
      an arm located between the image forming unit and the image reading unit,
   wherein, if the image reading unit is closed with respect to the image forming unit, the contact member contacts the arm, and urges the lock lever to disengage from the hook, to thereby automatically disengage the image reading unit and the automatic document feeder, and
   wherein, if the image reading unit is opened with respect to the image forming unit, the contact member separates from the arm, and the spring elastically pushes the lock lever to engage the hook, to thereby engage the image reading unit and the automatic document feeder.

16. The image forming apparatus of claim 15, wherein the arm further comprises
   a projection portion at an end of the arm; and
   a base portion at another end of the arm that is supported by an arm support located on the image forming unit.

17. The image forming apparatus according to claim 16, further comprising a guide member attached to a lower surface of the image reading unit that faces the image forming unit to allow the projection portion to be slidably inserted into a groove of the guide member.

18. The image forming apparatus according to claim 16, wherein, if the image reading unit is opened with respect to the image forming unit, the arm rotates about the arm support member to move the projection portion away from the contact member, thereby allowing the spring to push the lock lever to engage the hook.

19. The image forming apparatus according to claim 16, wherein, if the image reading unit is closed with respect to the image forming unit from an open position with respect to the image forming unit, the arm rotates about the arm support member to move the projection portion toward the contact member, thereby contacting the arm with the contact member, and pushing the lock lever to rotate away from the hook against an urging force of the spring.

20. The image forming apparatus according to claim 16, wherein, if the image reading unit is opened with respect to the image forming unit from a closed position with respect to the image forming unit, the arm rotates about the arm support member to move the projection portion away from the contact member, thereby disengaging the contact member from the arm, and allowing the spring to urge the lock lever to engage the hook.

* * * * *